(12) United States Patent
Fujimoto et al.

(10) Patent No.: US 10,535,435 B2
(45) Date of Patent: Jan. 14, 2020

(54) FUEL ASSEMBLY

(71) Applicant: Hitachi, Ltd., Chiyoda-ku, Tokyo (JP)

(72) Inventors: Kiyoshi Fujimoto, Tokyo (JP); Shirou Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 15/536,581

(22) PCT Filed: Dec. 4, 2015

(86) PCT No.: PCT/JP2015/084088
§ 371 (c)(1),
(2) Date: Jun. 15, 2017

(87) PCT Pub. No.: WO2016/098610
PCT Pub. Date: Jun. 23, 2016

(65) Prior Publication Data
US 2017/0337993 A1  Nov. 23, 2017

(30) Foreign Application Priority Data
Dec. 15, 2014  (JP) ................................. 2014-252591

(51) Int. Cl.
*G21C 3/33* (2006.01)
*G21C 5/06* (2006.01)
*G21C 7/08* (2006.01)

(52) U.S. Cl.
CPC ................. *G21C 3/33* (2013.01); *G21C 5/06* (2013.01); *G21C 7/08* (2013.01)

(58) Field of Classification Search
CPC .................................................. G21C 3/3305
See application file for complete search history.

(56) References Cited

U.S. PATENT DOCUMENTS

| 5,225,150 A | * | 7/1993 | Malandra | ............... | G21C 11/00 |
| | | | | | 376/263 |
| 5,479,464 A | * | 12/1995 | DeMario | ............... | G21C 3/334 |
| | | | | | 376/364 |

(Continued)

FOREIGN PATENT DOCUMENTS

| JP | 63-212891 A | 9/1988 |
| JP | 6-308269 A | 11/1994 |

(Continued)

OTHER PUBLICATIONS

Japanese-language Office Action issued in counterpart Japanese Application No. 2014-252591 dated Jul. 24, 2018 with English translation (seven (7) pages).

(Continued)

*Primary Examiner* — Lily C Garner
(74) *Attorney, Agent, or Firm* — Crowell & Moring LLP

(57) ABSTRACT

It is possible to achieve self-support of the fuel assembly without an upper grid plate when the fuel assembly is mounted or replaced, and it is also possible to prevent the fuel assembly from floating during a reactor operation. According to the present invention, the lower portion of the lower tie plate 7 as a part of the fuel assembly 3, which is inserted into the fuel support 9, extends, and a stable member 21 is provided around the extension portion 20, and thereby it is possible to achieve the self-support of the fuel assembly without the upper grid plate. In addition, since an increase in a weight due to extension of the lower portion of the lower tie plate 7 can prevent the floating during the reactor operation, a floating preventing mechanism using the upper grid plate is not necessary. Hence, it is possible to achieve the self-support of the fuel assembly without an upper grid plate when the fuel assembly is mounted or (Continued)

replaced, and it is also possible to prevent the fuel assembly from floating during the reactor operation.

4 Claims, 22 Drawing Sheets

(56) References Cited

U.S. PATENT DOCUMENTS

| | | | |
|---|---|---|---|
| 5,490,191 A * | 2/1996 | Christiansen | G21C 3/32 376/434 |
| 6,445,758 B1 | 9/2002 | Izumi et al. | |
| 8,396,182 B2 * | 3/2013 | Smith | G21C 3/3206 376/260 |
| 2008/0145174 A1 | 6/2008 | Suzuki et al. | |

FOREIGN PATENT DOCUMENTS

| | | |
|---|---|---|
| JP | 8-220276 A | 8/1996 |
| JP | 9-281260 A | 10/1997 |
| JP | 2000-147179 A | 5/2000 |
| JP | 2005-221326 A | 8/2005 |
| JP | 2005221326 A * | 8/2005 |
| JP | 2009-145093 A | 7/2009 |
| JP | 4386207 B2 | 12/2009 |
| JP | 2013-33065 A | 2/2013 |
| JP | 2013-145246 A | 7/2013 |
| WO | WO 2006/068144 A1 | 6/2006 |

OTHER PUBLICATIONS

International Search Report (PCT/ISA/210) issued in PCT Application No. PCT/JP2015/084088 dated Jan. 12, 2016 with English translation (five pages).

Japanese-language Written Opinion (PCT/ISA/237) issued in PCT Application No. PCT/JP2015/084088 dated Jan. 12, 2016 (five pages).

* cited by examiner

A-A

B-B

FUEL ASSEMBLY

TECHNICAL FIELD

The present invention relates to a fuel assembly of a boiling water reactor including densely arranged fuel assemblies.

BACKGROUND ART

FIGS. 18 to 20 illustrate a boiling water reactor in the related art. In FIG. 18, a nuclear reactor core 2 that is positioned at the center of a reactor pressure vessel 1 is configured of a plurality of fuel assemblies 3. FIG. 19 illustrates a support method of the fuel assembly 3. The fuel assembly 3 is configured to include a fuel rod 4, a spacer 5, an upper tie plate 6, a lower tie plate 7, a channel box 8, or the like. A lower portion of the lower tie plate 7 as a part of the fuel assembly 3 is inserted into four sockets 10 provided in a fuel support 9, and thereby the lower portion of the fuel assembly 3 is fixed. The fuel support 9 is fixed to a core plate 13. An opening 12 is provided at the center of the fuel support 9 such that a cross-shape type control rod 11 can vertically move. An upper portion of the fuel assembly 3 is supported in a horizontal direction by an upper grid plate 14 that is mounted above the nuclear reactor core 2. In FIG. 20, the cross-shape type control rod 11 is disposed at the center of the four fuel assemblies 3, and an installation of neutron instrumentation tube 15 is mounted on the periphery of a location in which the cross-shape type control rod 11 is disposed.

The fuel assemblies 3 are mounted in the reactor pressure vessel 1, in a state in which the core plate 13 and the fuel support 9 below the fuel assemblies 3 are mounted in advance, and the upper grid plate 14 is also mounted above the fuel assemblies 3. Since the bottom of the fuel assembly 3 is supported by the fuel support 9, and the top of the fuel assembly 3 is supported by the upper grid plate 14, it is possible to mount the fuel assembly 3 in the reactor pressure vessel 1 in a self-support manner. Note that the same is true of when the fuel assembly is replaced.

FIGS. 21 and 22 illustrate a fuel assembly of a boiling water reactor including densely arranged fuel assemblies. As illustrated in FIG. 21, a Y-shape type control rod 16 is disposed between the fuel assemblies 3 that are configured to include a plurality of fuel rods 4 and a hexagonal channel box 8, and the installation of neutron instrumentation tube 15 is disposed at a wing of the Y-shape type control rod 16. FIG. 22 illustrates a support method of the fuel assembly 3. The fuel assembly 3 is configured to include a fuel rod (not illustrated), a spacer (not illustrated), the upper tie plate 6, the lower tie plate 7, the channel box 8, or the like. The lower portion of the lower tie plate 7 as a part of the fuel assembly 3 is inserted into three sockets 10 provided in the fuel support 9, and thereby the lower portion of the fuel assembly 3 is fixed. The opening 12 is provided at the center of the fuel support 9 such that the Y-shape type control rod 16 can vertically move, and the fuel support 9 is fixed to the core plate 13. The fuel assembly 3 is pressed from above at the upper grid plate 14, and thereby the upper portion of the fuel assembly 3 is supported in the horizontal direction via an upper support mechanism 17 provided between the fuel assembly 3 and the upper grid plate 14. In addition, in the fuel assembly 3 of the boiling water reactor including densely arranged fuel assemblies, an outer diameter of the fuel rod 4 is smaller by several millimeters than an outer diameter of the fuel rod 4 used in the fuel assembly of the boiling water reactor in the related art in FIG. 19, and the length of one fuel rod also decreases to have substantially a half of the length. Further, since a weight per one fuel rod decreases to have substantially a third of the weight, the weight of the entire fuel assembly 3 also decreases, compared to the fuel assembly 3 of the boiling water reactor in the related art illustrated in FIG. 19.

In a boiling water reactor disclosed in JP-A-9-281260, a lower portion of a fuel assembly is supported by a fuel support via a lower tie plate and a mass adding member, and an upper portion of the fuel assembly is supported by an upper grid plate via an upper tie plate. In addition, the mass adding member is provided below the lower tie plate so as to prevent the fuel assembly from floating.

A boiling water reactor disclosed in JP-A-8-220276 prevents a fuel assembly from horizontally moving by a tab and a leaf spring provided between the fuel assembly and an upper grid plate, and secures gap holding of the fuel assembly and insertability of a control rod. In addition, a hold down spring is provided between the fuel assembly and the upper grid plate, and thereby the fuel assembly is prevented from floating. In the published invention, the upper grid plate is a member that is necessary for achieving self-support of the fuel assembly and for preventing the fuel assembly from floating. In addition, in a boiling water reactor disclosed in JP-A-2013-145246, the fuel rod is supported by an upper tie plate and a lower tie plate.

In a boiling water reactor disclosed in Japanese Patent No. 4386207, similar to FIG. 18, a method for supporting upper and lower portions of the fuel assembly by an upper grid plate and a fuel support is disclosed. In addition, even a pressurized water reactor disclosed in JP-A-2000-147179 has a structure in which upper and lower portions of the fuel assembly are supported by upper and lower core plates, respectively.

JP-A-6-308269 discloses a support method of a fuel assembly in a fast breeder reactor. Plates that are referred to as an upper core support structure and a lower core support structure are provided below a reactor pressure vessel, the upper and lower plates are connected to a plurality of connection pipes, and a lower portion of a fuel assembly is inserted into the connection pipe such that the lower portion of the fuel assembly is supported. In this manner, self-support of the fuel assembly is secured.

CITATION LIST

Patent Literature

PTL 1: JP-A-9-281260
PTL 2: JP-A-8-220276
PTL 3: JP-A-2013-145246
PTL 4: Japanese Patent No. 4386207
PTL 5: JP-A-2000-147179
PTL 6: JP-A-6-308269

SUMMARY OF INVENTION

Technical Problem

In the boiling water reactor illustrated in FIGS. 18 to 20, since the fuel assembly is mounted in the state in which the upper grid plate is mounted, it is possible to secure self-support of the fuel assembly. On the other hand, in the fuel assembly of the boiling water reactor including densely arranged fuel assemblies illustrated in FIGS. 21 and 22, as illustrated in FIG. 22, a structure in which the fuel assembly is supported in the horizontal direction by the opening of the upper grid plate similar to that in FIG. 19 is not employed.

In order to secure the self-support of the fuel assembly, the upper support mechanism is provided between the upper grid plate and the upper portion of the fuel assembly. Hence, it is necessary to remove the upper grid plate when the fuel assembly is mounted or replaced, and it is also necessary to self-support the fuel assembly without the upper grid plate. As described in Background Art, the fuel assembly illustrated in FIG. 22 has a weight lighter than the fuel assembly in FIG. 19. Therefore, a fluid force (force that is generated when a fluid collides with a portion (for example, a portion except for a channel portion and a portion of the lower tie plate into which the lower portion of the fuel rod is inserted so as to be supported) which interferes with upward flow in a structure in the fuel assembly and that causes the structure or the fuel assembly to float) increases due to a weight of the fuel assembly in a condition in which a flow rate increases, and there is a possibility that the fuel assembly floats upward. Therefore, it is necessary to prevent the floating.

In the boiling water reactor disclosed in JP-A-9-281260, it is possible to secure the self-support of the fuel assembly because the fuel assembly is supported by the upper tie plate and the lower tie plate; however, it is necessary to remove the upper grid plate when the fuel assembly is mounted or replaced. In addition, the mass adding member is provided a countermeasure against the floating of the fuel assembly; however, in the boiling water reactor including the densely arranged fuel assemblies, layout of the installation of neutron instrumentation tubes required for knowing a reactor output or finding whether neutron flux does not rapidly increase during pulling-out of the control rod is not taken into account. In order to establish the boiling water reactor including the densely arranged fuel assemblies, the neutron flux needs to be measured by the installation of neutron instrumentation tube, and thus it is necessary to determine a shape of the mass adding member or the like in consideration of the layout of the installation of neutron instrumentation tubes.

In the boiling water reactor disclosed in JP-A-8-220276, the upper portion of the fuel assembly is supported by the tab or the leaf spring provided between the fuel assembly and the upper grid plate; however, it is necessary to remove the upper grid plate when the fuel assembly is mounted or replaced, similar to the published literature. In addition, the hold down spring is provided between the fuel assembly and the upper grid plate so as to prevent the fuel assembly from floating; however, the upper grid plate is a member that is required for mounting of the hold down spring. In addition, in the boiling water reactor disclosed in JP-A-2013-145246, the fuel rod is supported by the upper tie plate and the lower tie plate; however, the self-support of the fuel assembly having a combined structure is not described.

Both of Japanese Patent No. 4386207 and JP-A-2000-147179 employ a structure in which the upper and lower portions of the fuel assembly are supported by the upper and lower core plates, respectively, and it is necessary to remove the upper grid plate when the fuel assembly is mounted or replaced.

In JP-A-6-308269, it is necessary to mount a structure in addition to the fuel assembly in the reactor pressure vessel, and vertical movement of the control rod or the layout of the installation of neutron instrumentation tubes is not taken into account in the upper core support structure or the lower core support structure.

An object of the present invention is that, in a fuel assembly of a boiling water reactor including densely arranged fuel assemblies, the self-support of the fuel assembly is secured when the fuel assembly is mounted or replaced, the fuel assembly is prevented from floating during an operation, and it is not necessary to provide the upper grid plate.

Solution to Problem

According to the present invention, a lower portion of a lower tie plate that is inserted into a socket above the fuel support extends, and a stable member is provided around the extension portion.

Advantageous Effects of Invention

According to the present invention, in a fuel assembly of a boiling water reactor including densely arranged fuel assemblies, the self-support of the fuel assembly is secured when the fuel assembly is mounted or replaced, and the fuel assembly is prevented from floating during an operation, and it is possible not to provide the upper grid plate.

DESCRIPTION OF EMBODIMENTS

Hereinafter, examples will be described.

Example 1

Figure 21:
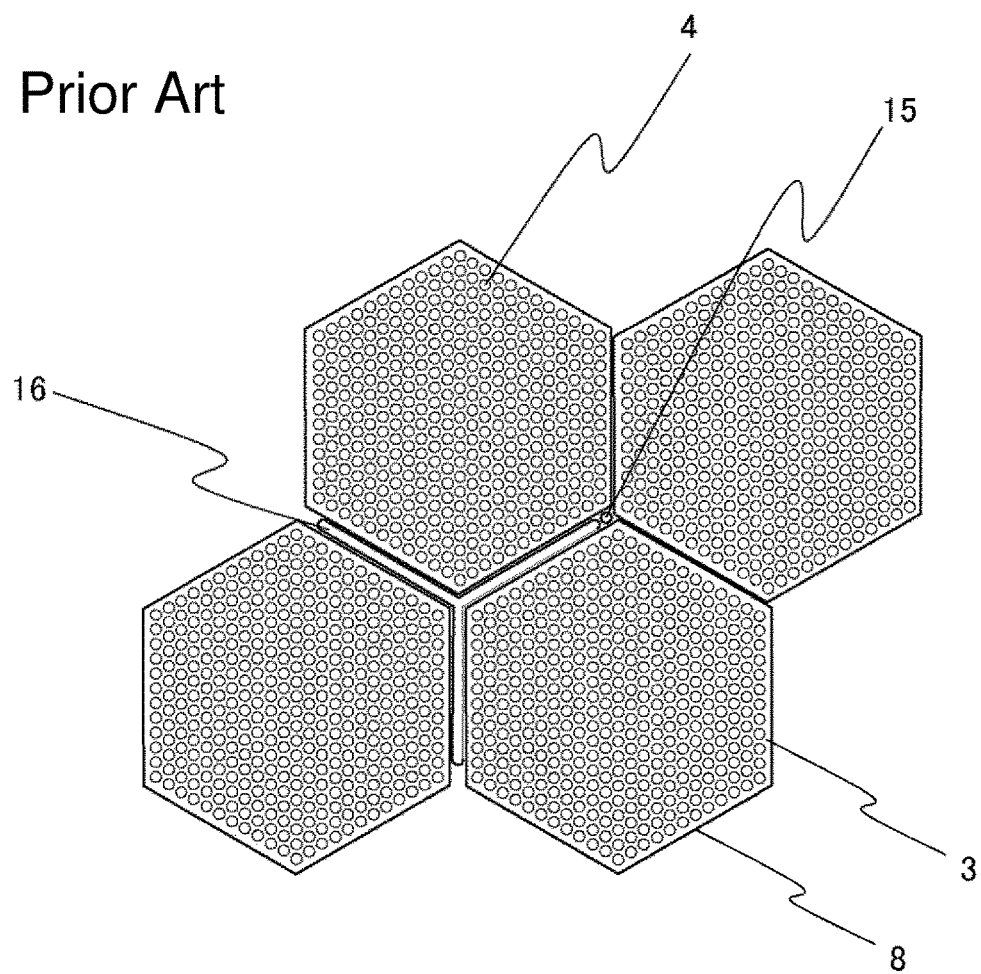
FIG. 21 is a horizontal view illustrating a fuel assembly of a boiling water reactor in the related art that includes densely arranged fuel assemblies.
Figure 22:
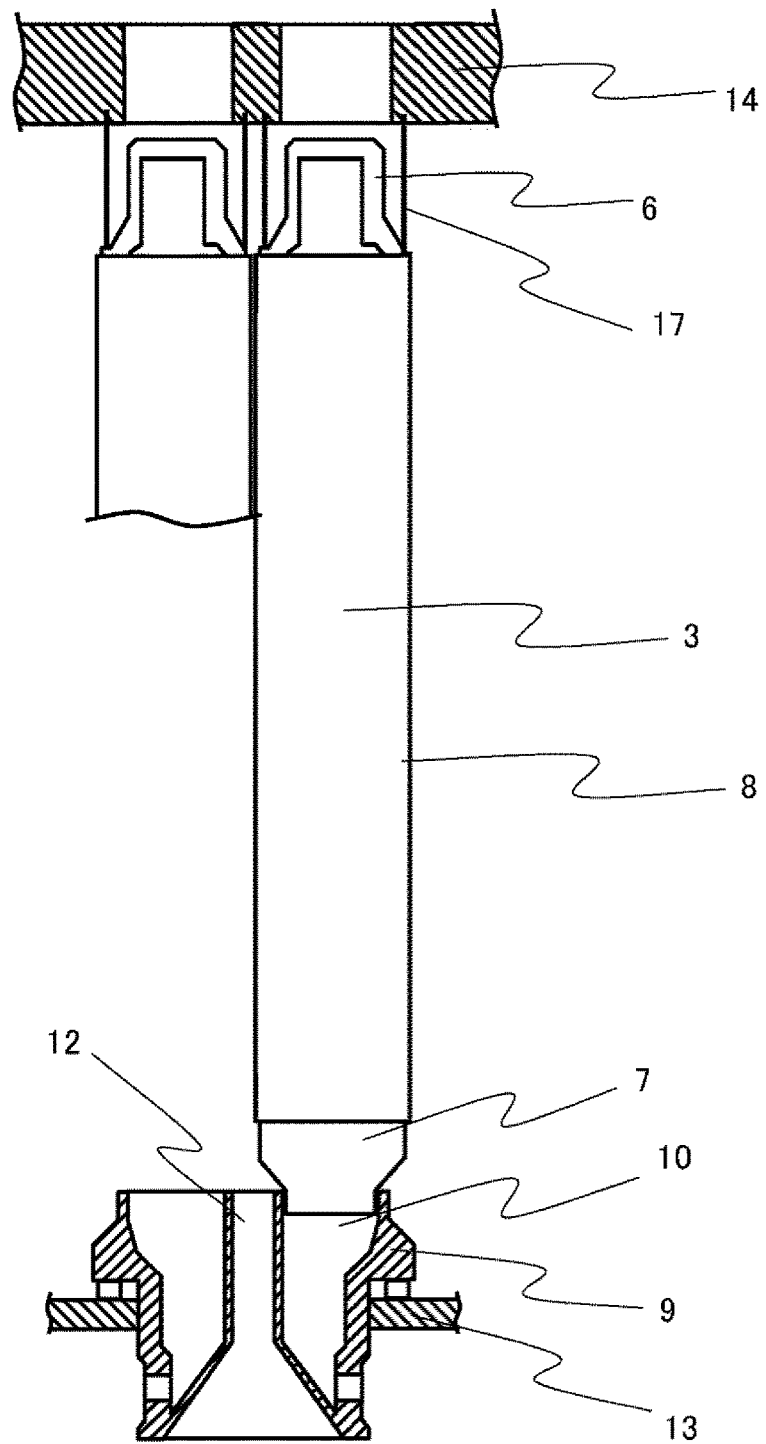
FIG. 22 is a side view illustrating the fuel assembly of the boiling water reactor in the related art that includes densely arranged fuel assemblies.

FIGS. 1 to 8 illustrate the example of the present invention. As illustrated in FIG. 21, a boiling water reactor, to which the example is applied, is configured to include fuel assemblies 3 that are accommodated in a hexagonal channel box 8 in which fuel rods 4 are arranged to form a triangular lattice shape, a Y-shape type control rod 16 having three wings with interval angles of the wings at 120 degrees, which are inserted between the fuel assemblies, and an installation of neutron instrumentation tube 15 that is disposed at a distal end of the wing of the Y-shape type control rod 16.

Figure 1:
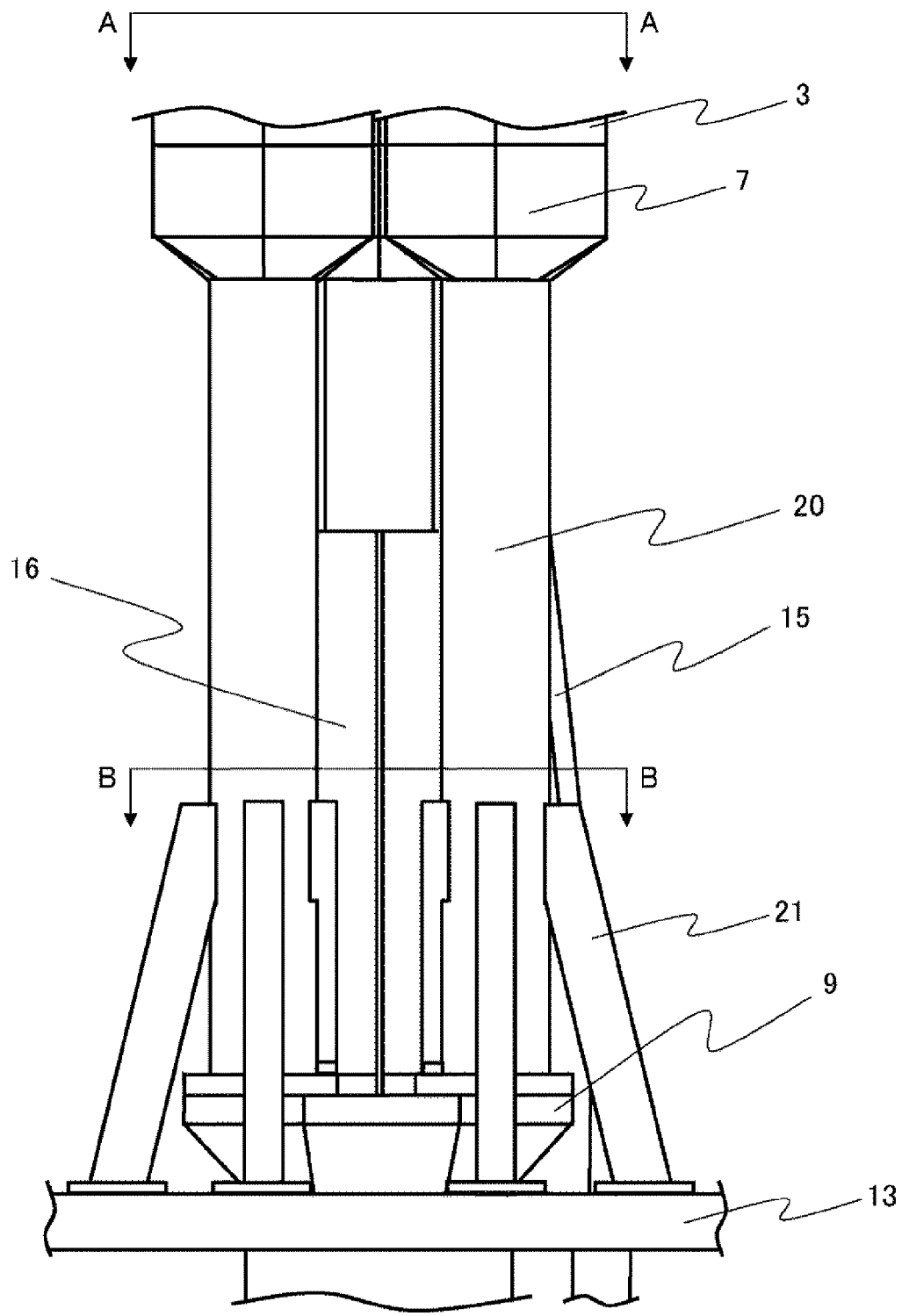
FIG. 1 is a side view (1) illustrating a fuel assembly of the example.

The fuel assembly 3 is configured to include the fuel rods 4 (refer to FIG. 2), an upper tie plate 6 (not illustrated), a spacer 5 (not illustrated), a lower tie plate 7, and a channel box 8 (refer to FIG. 2), and component members as characteristics of the example include an extension portion 20 that extends from the lower portion of the lower tie plate 7 as illustrated in FIG. 1, and a stable member 21 that is provided around the extension portion 20 so as to secure the self-support of the fuel assembly 3. Note that a channel is formed in the extension portion 20 of the lower portion of the lower tie plate 7 such that a coolant discharged from the socket 10 of the fuel support 9 is sent to the fuel assembly 3.

Figure 6:
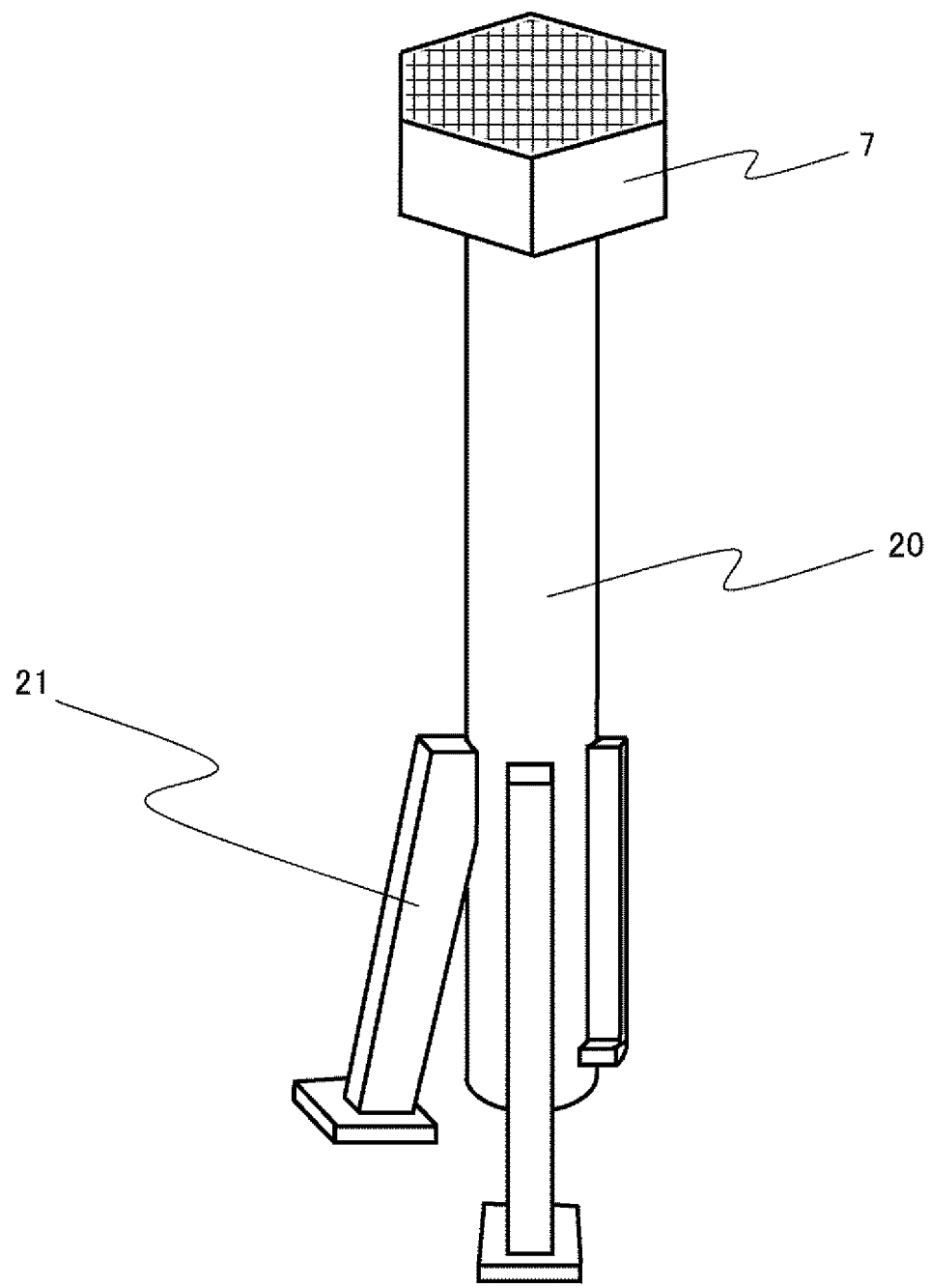
FIG. 6 is a view illustrating a lower tie plate of the fuel assembly of the example.
Figure 7:
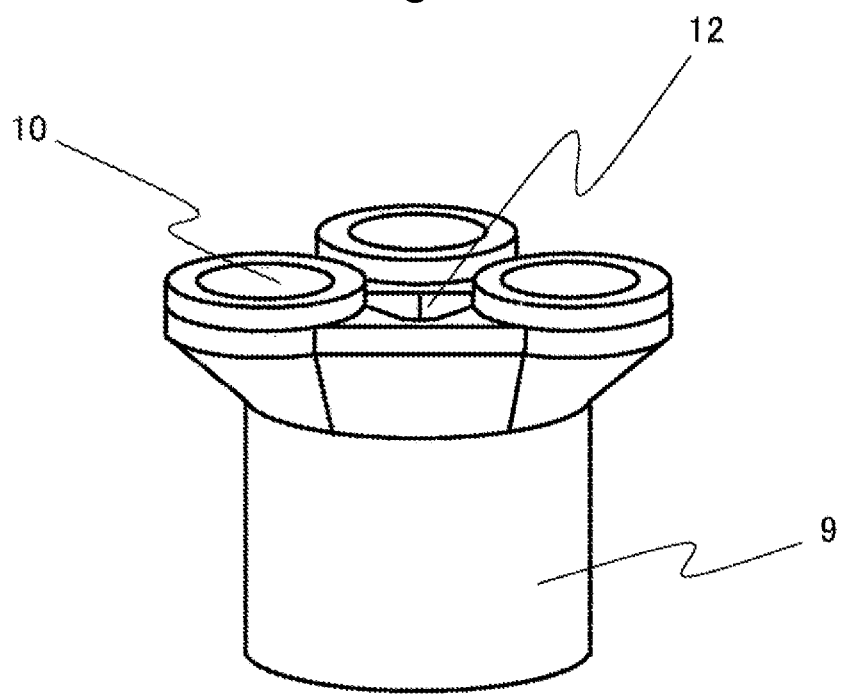
FIG. 7 is a view illustrating a fuel support that is disposed below the fuel assembly of the example.

FIGS. 1 to 5 are side views, horizontal sectional views, and a bird's eye view illustrating a state in which the fuel assembly 3 including the lower tie plate 7, the fuel support 9, the core plate 13, the Y-shape type control rod 16, and the installation of neutron instrumentation tube 15 are assembled. FIG. 6 illustrates the lower tie plate 7, and FIG. 7 illustrates the fuel support 9. As illustrated in FIG. 6, the lower portion of the lower tie plate 7 extends, and the stable members 21 are attached by welding or the like at several positions around the extension portion 20. Note that the extension portion 20 or the stable members 21 of the lower tie plate 7 are manufactured to have an integral structure. The upper portion of the lower tie plate 7 is connected and is fixed to the fuel rod 4 or the channel box 8, and the lower portion of the lower tie plate 7 is inserted into the socket 10 of the upper portion of the fuel support 9 illustrated in FIG. 7 so as to fitted and fixed thereto. Note that an opening 12 is provided at the center of the fuel support 9 such that a Y-shape type control rod 16 can vertically move.

As illustrated in FIGS. 1 and 3 to 5, in such a structure, a lower end surface of the stable member 21, which is attached to the extension portion of the lower portion of the lower tie plate 7, is in contact with an upper surface of the core plate 13 or the fuel support 9. In the example, the lower portion of the lower tie plate 7 extends, and thereby the center of gravity at which the extension portion 20 of the lower portion of the lower tie plate 7 has the weight, is lowered. Therefore it is possible to improve the stability. In addition, the stable members 21 are attached in four directions around the extension portion 20 of the lower portion of the lower tie plate 7, the lower end surface of the stable member 21 comes into contact with the upper surface of the core plate 13 or the fuel support 9. In this manner, it is possible to secure the self-support of the fuel assembly 3. Note that, in the example, the stable members 21 are attached in four directions around the extension portion of the lower portion of the lower tie plate 7; however, there is no problem even when the stable members are attached in three directions or in five or more directions.

Figure 2:
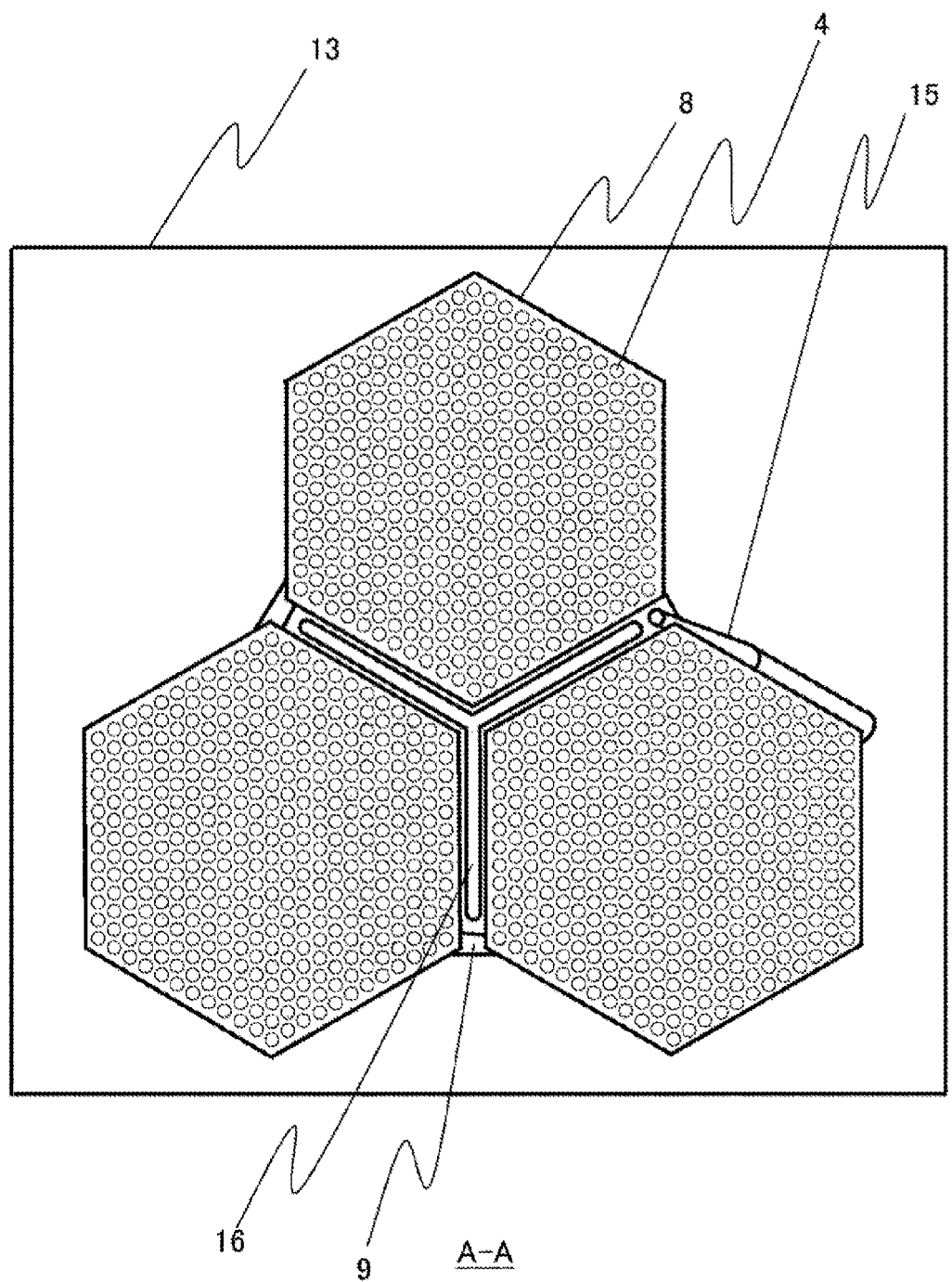
FIG. 2 is a horizontal sectional view (A-A) in the side view (1) of the fuel assembly of the example.
Figure 3:
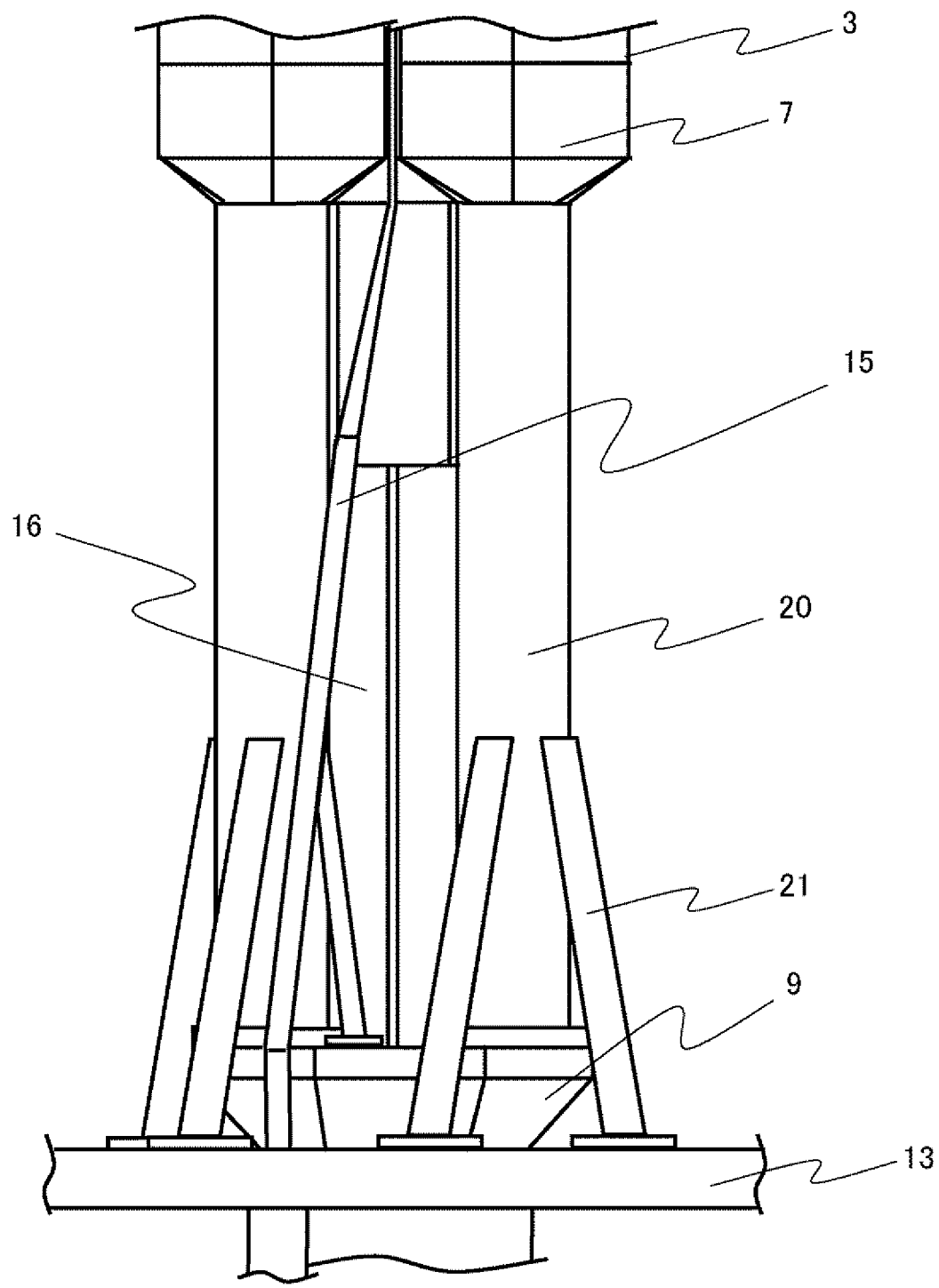
FIG. 3 is a side view (2) illustrating the fuel assembly of the example.
Figure 4:
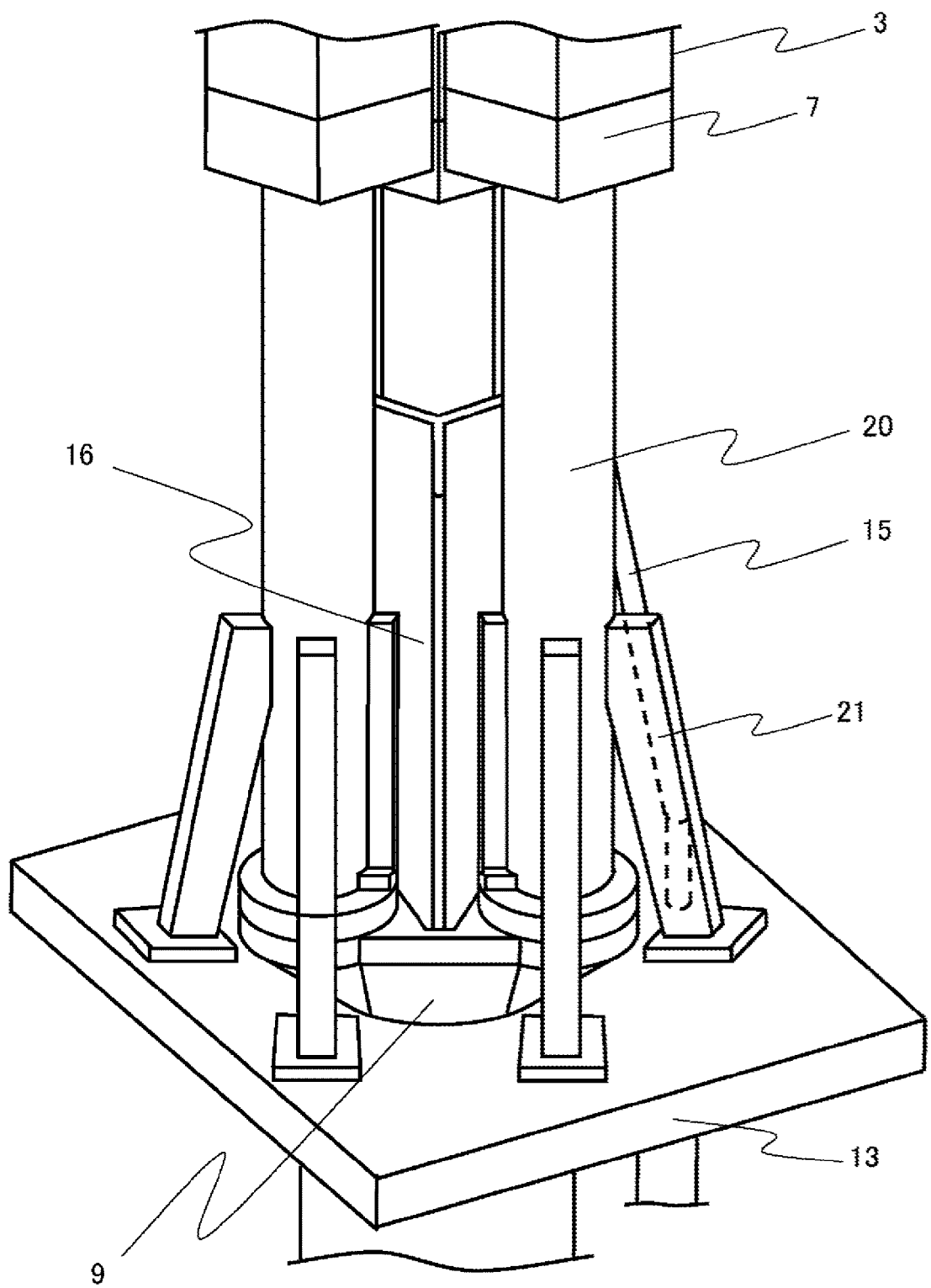
FIG. 4 is a bird's-eye view of a side view (1) illustrating the fuel assembly of the example.
Figure 5:
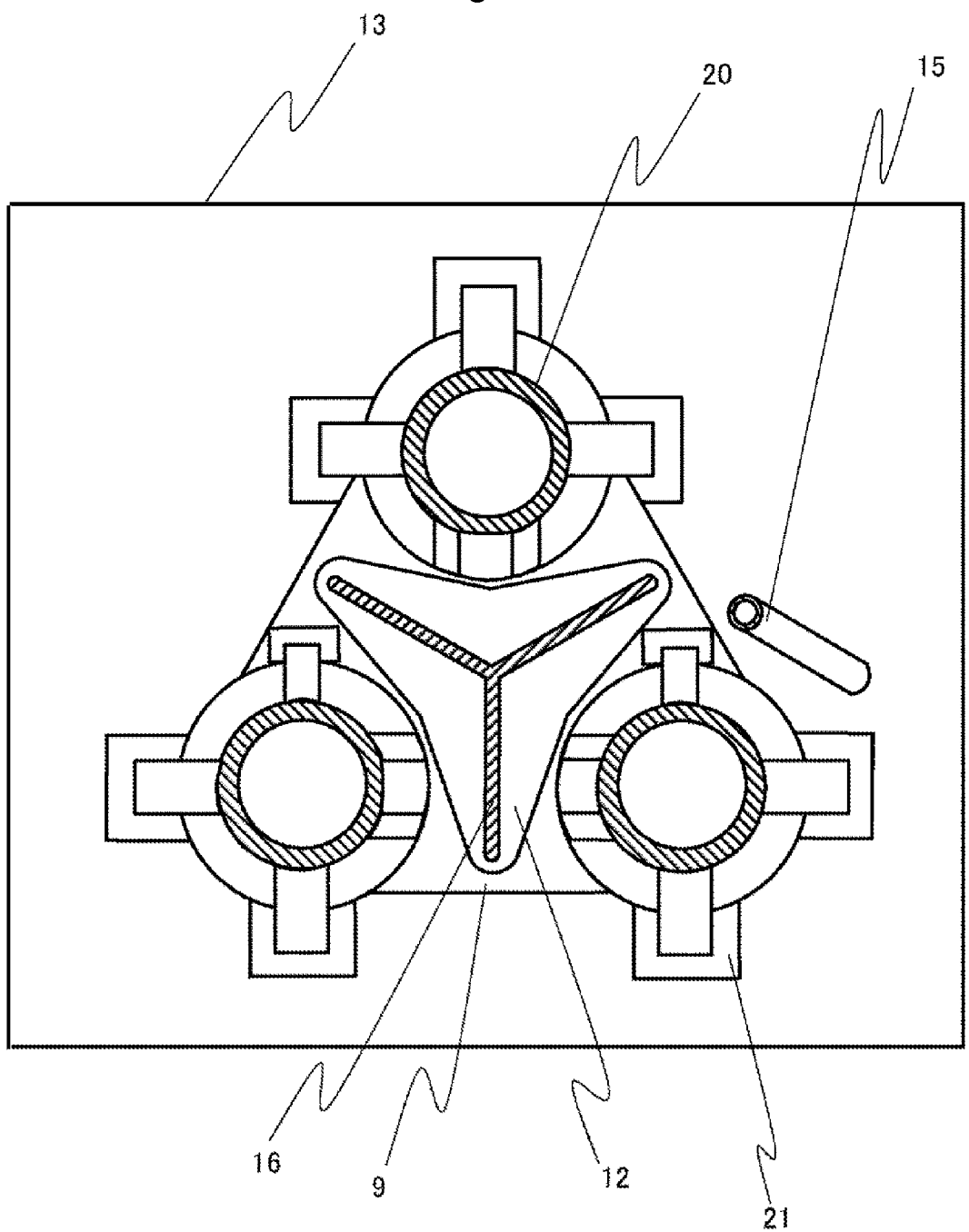
FIG. 5 is a horizontal sectional view (B-B) in the side view (1) of the fuel assembly of the example.

As illustrated in a horizontal cross section of FIG. 2, in a range of a disposition height of the channel box 8 as a part of the fuel assembly 3, the installation of neutron instrumentation tube 15 is disposed at a distal end of the wing of the Y-shape type control rod 16. The installation of neutron instrumentation tube 15 needs to find a reactor output or that the neutron flux does not rapidly increase during pulling out of the control rod, and the installation of neutron instrumentation tube locally measures and monitors the neutron flux by a detector in the installation of neutron instrumentation tube on the periphery of the disposition positions in the nuclear reactor core. A structure is employed in which the upper distal end of the installation of neutron instrumentation tube 15 is supported and fixed to the channel box 8 in the vicinity of the upper end of the fuel assembly 3 and the lower portion of the tube is pulled from the bottom of the reactor pressure vessel 1 out of the reactor pressure vessel 1. When the installation of neutron instrumentation tube 15 disposed at the distal end of the wings of the Y-shape type control rod 16 is disposed to be straightly downward and to pass around, the installation of neutron instrumentation tube 15 interferes with a control rod guiding tube (not illustrated), or a control rod driving mechanism housing (not illustrated), or the like interfere with each other. Therefore, a position is shifted on a horizontal plane to an inclined lower right position from the distal end position of the wing of the Y-shape type control rod 16 as illustrated in FIG. 2, and thereby the installation of neutron instrumentation tube 15 does not interfere with a structure in the reactor pressure vessel 1. Note that, in the example, the stable members 21, which are provided on the periphery of the extension portion 20 of the lower portions of the lower tie plate 7, are disposed at positions at which the stable members do not interfere with the installation of neutron instrumentation tube 15, and thereby it is possible to secure the self-support of the fuel assembly 3. In addition, a detector for measuring the neutron flux in the installation of neutron instrumentation tube 15 is mounted, and the detector needs to move in the installation of neutron instrumentation tube 15. An outer diameter of the distal end of the detector is several millimeters, a length without a bent portion is from several millimeters to hundreds of millimeters, and then there is a sensor cable for the detector. Since the portion without a bent portion is present, it is preferable that the curvature of the installation of neutron instrumentation tube 15 increases. In the example, the lower portion of the lower tie plate 7 extends, and a length from the core plate 13 to the above of the extension portion 20 of the lower portion of the lower tie plate 7 increases, and the curvature of the installation of neutron instrumentation tube 15 increases. Therefore, it is possible for the detector to vertically move in the installation of neutron instrumentation tube 15.

Further, the lower portion of the lower tie plate 7 extends, and thereby the extension portion 20 of the lower tie plate 7 has the weight. Therefore, it is possible to prevent the fuel assembly 3 from floating. Note that, the extension portion 20 of the lower portion of the lower tie plate 7 has a columnar shape in the example; however, the extension portion may have a rectangular shape or a hexagonal shape as long as the extension portion does not interfere with the Y-shape type control rod 16 or the installation of neutron instrumentation tube 15.

Figure 8:
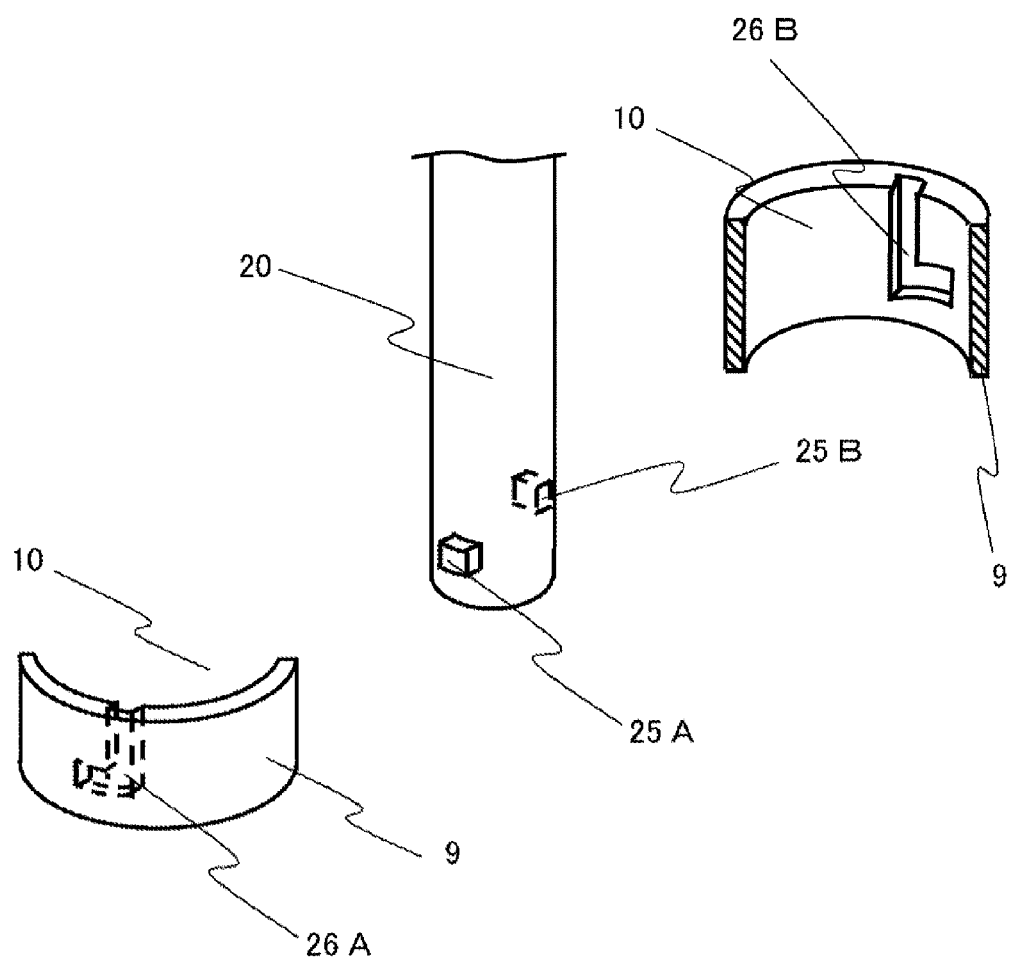
FIG. 8 is a detailed view illustrating an extension portion of the lower portion of the lower tie plate and a socket above the fuel support of the fuel assembly of the example.

In addition, FIG. 8 illustrates an example of fitting of the extension portion 20 of the lower portion of the lower tie plate 7 into the socket 10 above the fuel support 9. Protrusions 25A and 26A are provided on the extension portion 20 of the lower portion of the lower tie plate 7, are inserted into fitting portions 25B and 26B provided in an inner surface of the socket 10 of the upper portion of the fuel support 9 so as to be fixed, and thereby the extension portion 20 of the lower portion of the lower tie plate 7 does not move out from the socket 10 of the upper portion of the fuel support 9 even when an earthquake occurs.

Example 2

Figure 9:
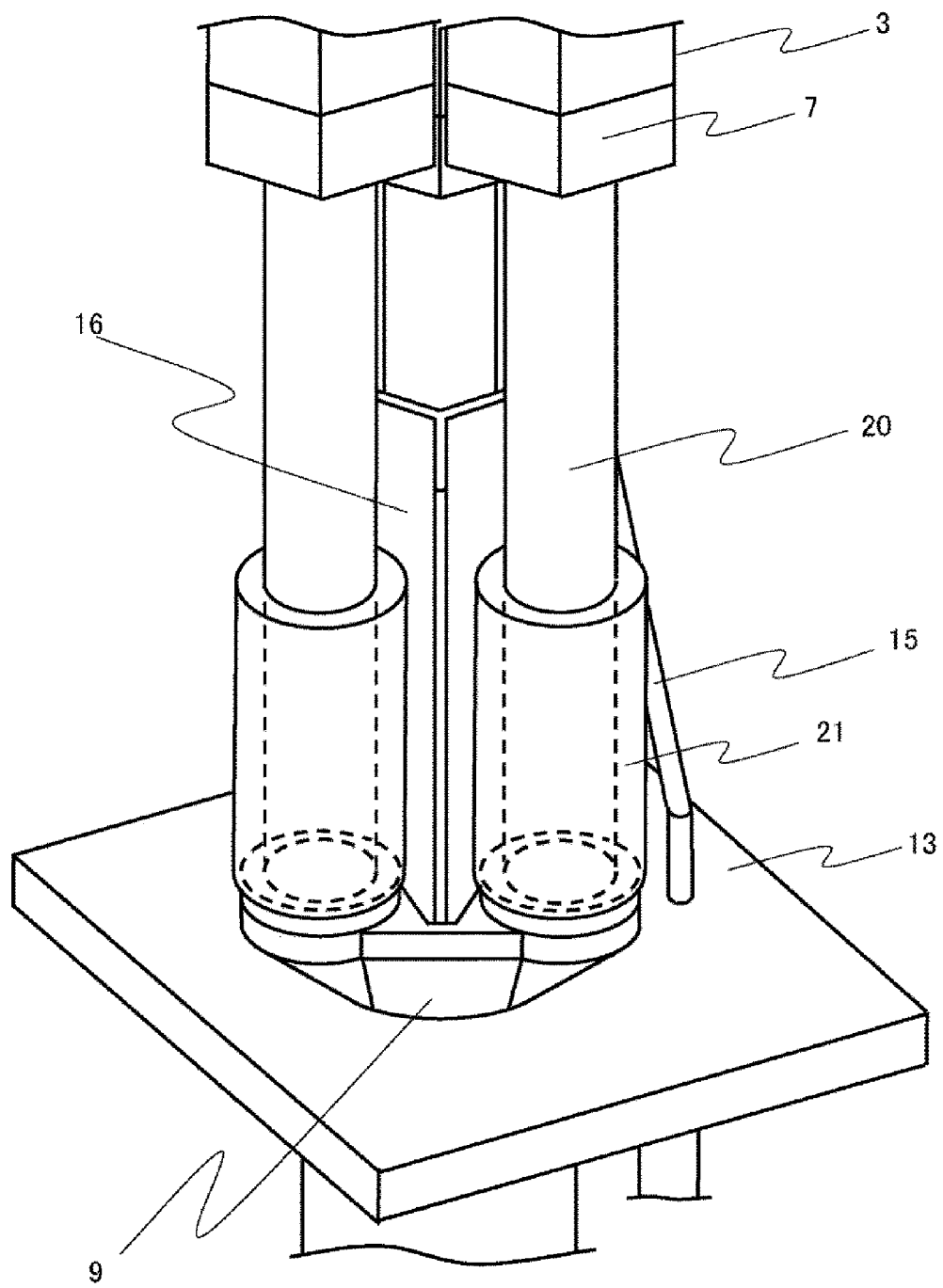
FIG. 9 is a bird's-eye view of a side view (1) of a fuel assembly of another example of the present invention.
Figure 10:
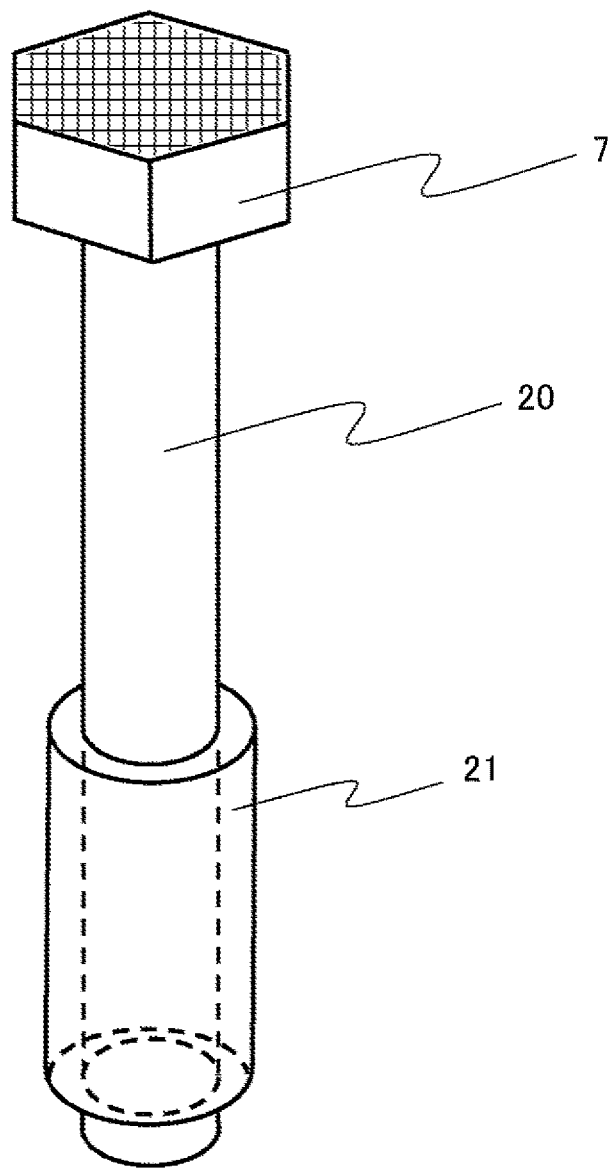
FIG. 10 is a view illustrating a lower tie plate of the fuel assembly of the example of the present invention.

FIGS. 9 and 10 illustrate Example 2. A component member as the characteristics of the example includes the stable member 21 such that a load is evenly applied over the entire circumference of the extension portion 20 of the lower portion of the lower tie plate 7 as illustrated in FIG. 10.

As illustrated in FIG. 10, the stable member 21 increases in size of the lower portion of the extension portion 20, in a concentric circle with the extension portion 20 of the lower portion of the lower tie plate 7. The load is evenly applied over the entire circumference of the extension portion 20 of the lower portion of the lower tie plate 7, and thereby it is possible to secure the self-support of the fuel assembly 3.

Further, as illustrated in FIG. 10, the extension portion 20 of the lower portion of the lower tie plate 7 and the stable member 21 are manufactured to have a columnar shape, and thus it is possible to easily realize the self-support of the fuel assembly 3. In addition, as illustrated in FIG. 10, the stable member 21 has the same outer diameter regardless of the height; however, the outer diameter of the stable member 21 increases as a position of the stable member 21 is close to the lower side of the stable member 21. In this manner, the center of gravity of the lower tie plate 7 is lowered, and the stability more improved.

Example 3

Figure 11:
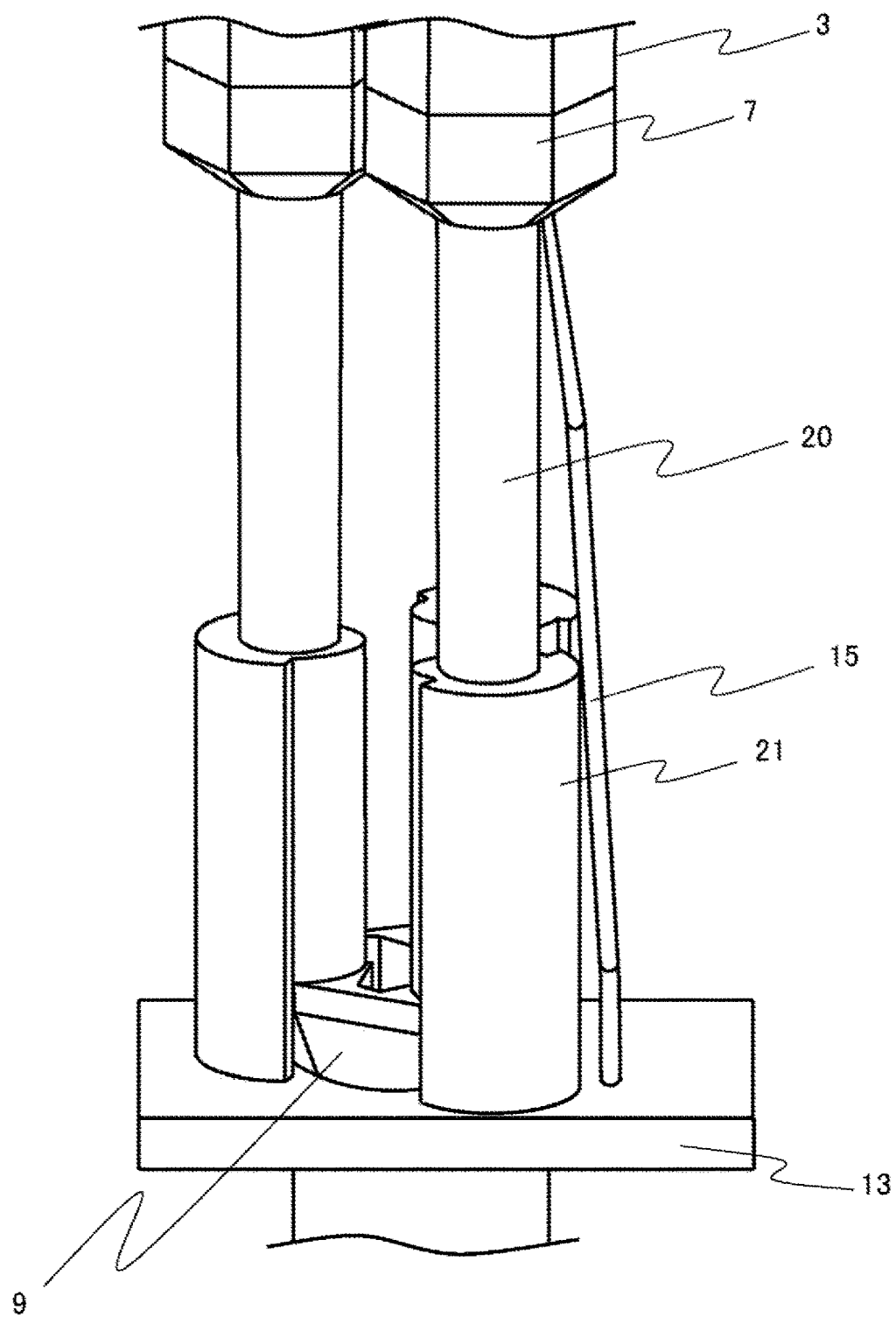
FIG. 11 is a bird's-eye view of a side view (3) of a fuel assembly of still another example of the present invention.
Figure 12:
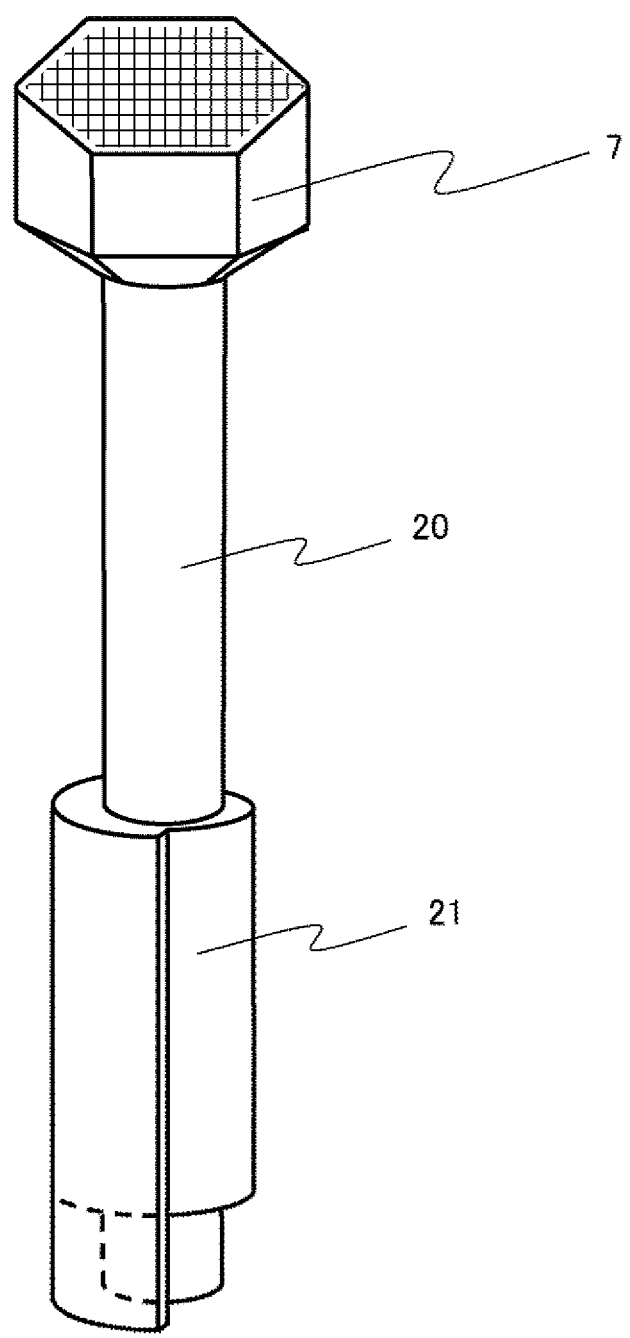
FIG. 12 is a view illustrating a lower tie plate of the fuel assembly of the example of the present invention.

FIGS. 11 and 12 illustrate Example 3. According to component members as the characteristics of the example, the lower end surface of the stable member 21 is in contact with the upper surface of the core plate 13 such that the load is evenly applied over the entire circumference of the extension portion 20 of the lower portion of the lower tie plate 7 as illustrated in FIG. 12.

As illustrated in FIG. 12, the stable member 21 increases in size of the lower portion of the extension portion 20, in a concentric circle with the extension portion 20 of the lower portion of the lower tie plate 7. Further, a part of the outer circumferential portion of the stable member 21 extends until the part of the outer circumferential portion comes into contact with the upper surface of the core plate 13. It is possible to improve the stability by increasing an area that is in contact with the core plate 13, and it is possible to secure the self-support of the fuel assembly 3.

Example 4

Figure 13:
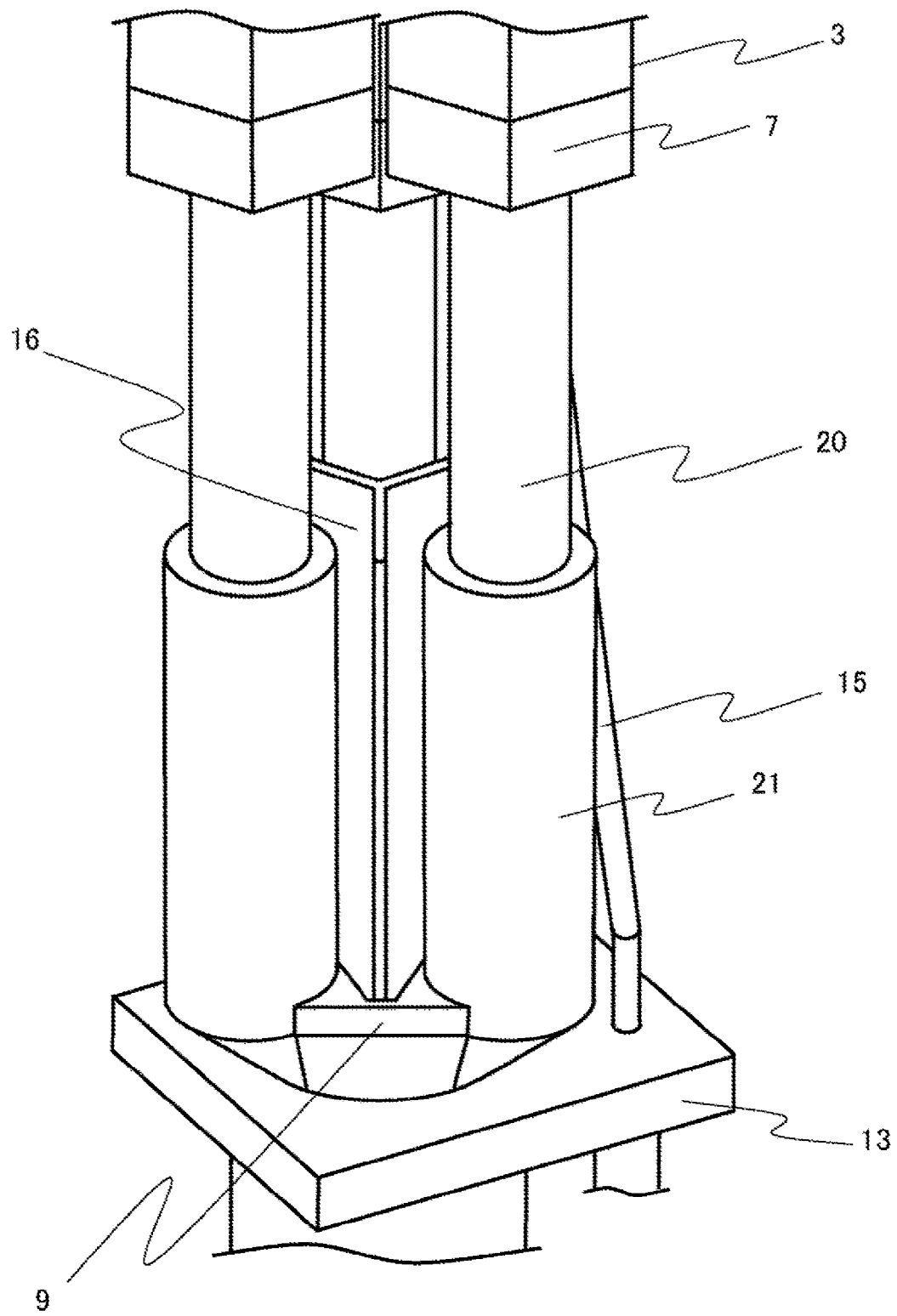
FIG. 13 is a bird's-eye view of a side view (1) of a fuel assembly of still another example of the present invention.
Figure 14:
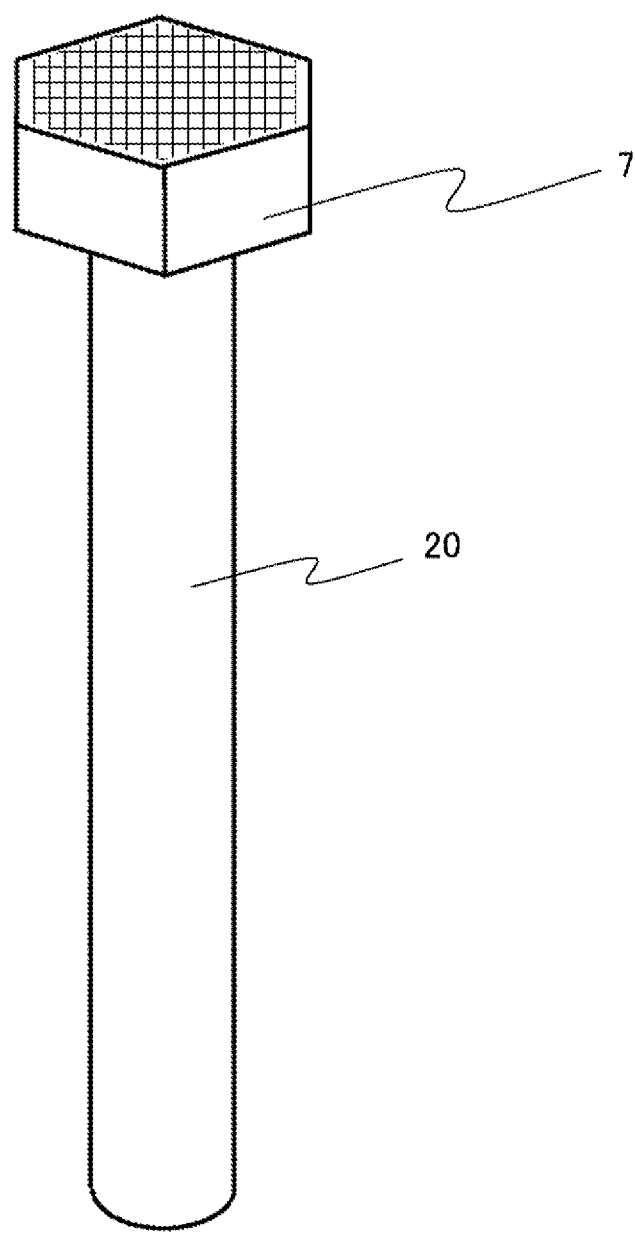
FIG. 14 is a view illustrating a lower tie plate of the fuel assembly of the example of the present invention.
Figure 15:
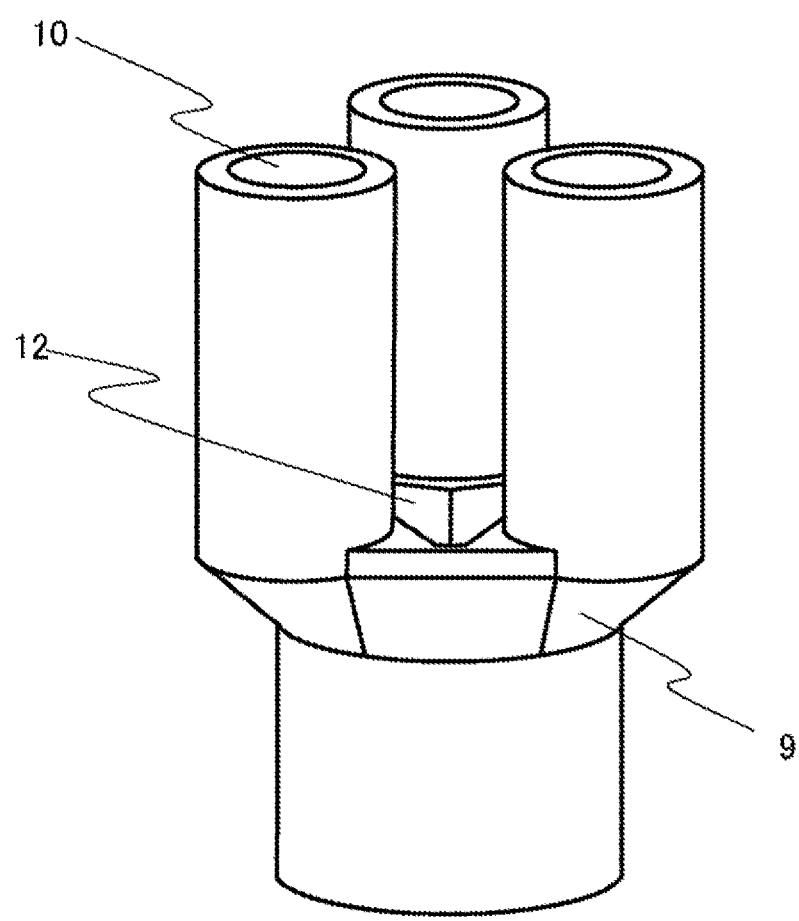
FIG. 15 is a view illustrating a fuel support that is disposed below the fuel assembly of the example of the present invention.

FIGS. 13 and 15 illustrate Example 4. According to component members as the characteristics of the example, the lower portion of the lower tie plate 7 extends as illustrated in FIG. 14, and the three sockets 10 of the fuel support 9 extend upward as illustrated in FIG. 15.

As illustrated in FIG. 13, the portion extending from the lower portion of the lower tie plate 7 is inserted and fitted into the socket 10 in the upper portion of the fuel support 9; however, the fitted portion increases. Since the fuel support 9 is fixed to the core plate 13, a fitting portion of the extension portion 20 of the lower tie plate 7 into the fuel support 9 increases. In this manner, it is possible to secure the self-support of the fuel assembly 3. Note that the fuel support 9 is manufactured by casting or forging, and then is cut out. In this manner, it is possible to realize a structure illustrated in FIG. 15.

Example 5

Figure 16:
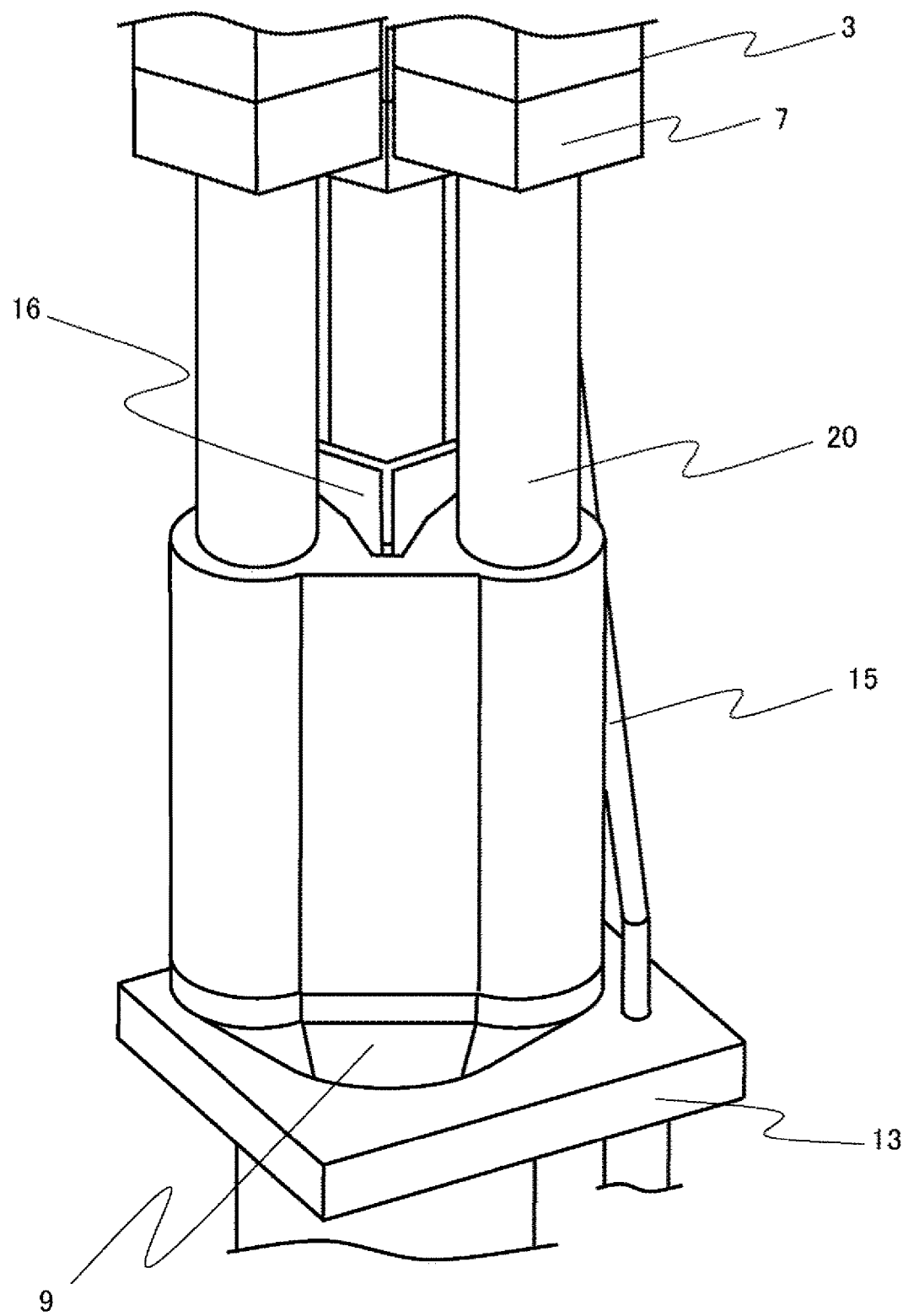
FIG. 16 is a bird's-eye view of a side view (1) of a fuel assembly of still another example of the present invention.
Figure 17:
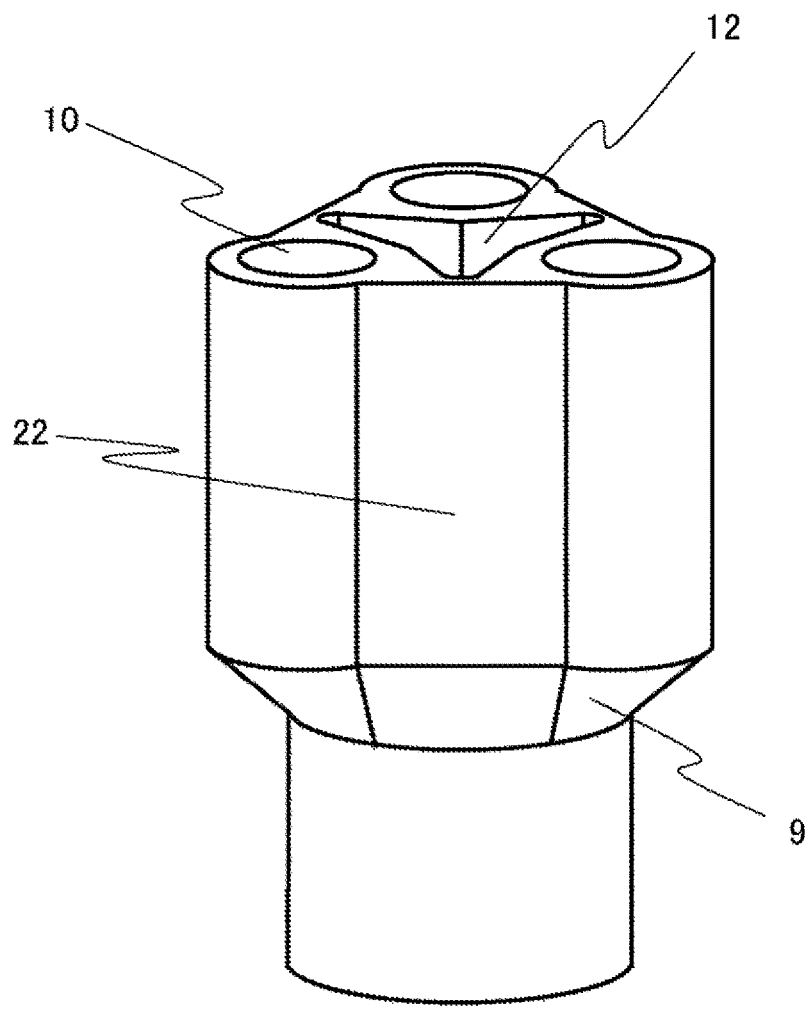
FIG. 17 is a view illustrating a fuel support that is disposed below the fuel assembly of the example of the present invention.
Figure 18:
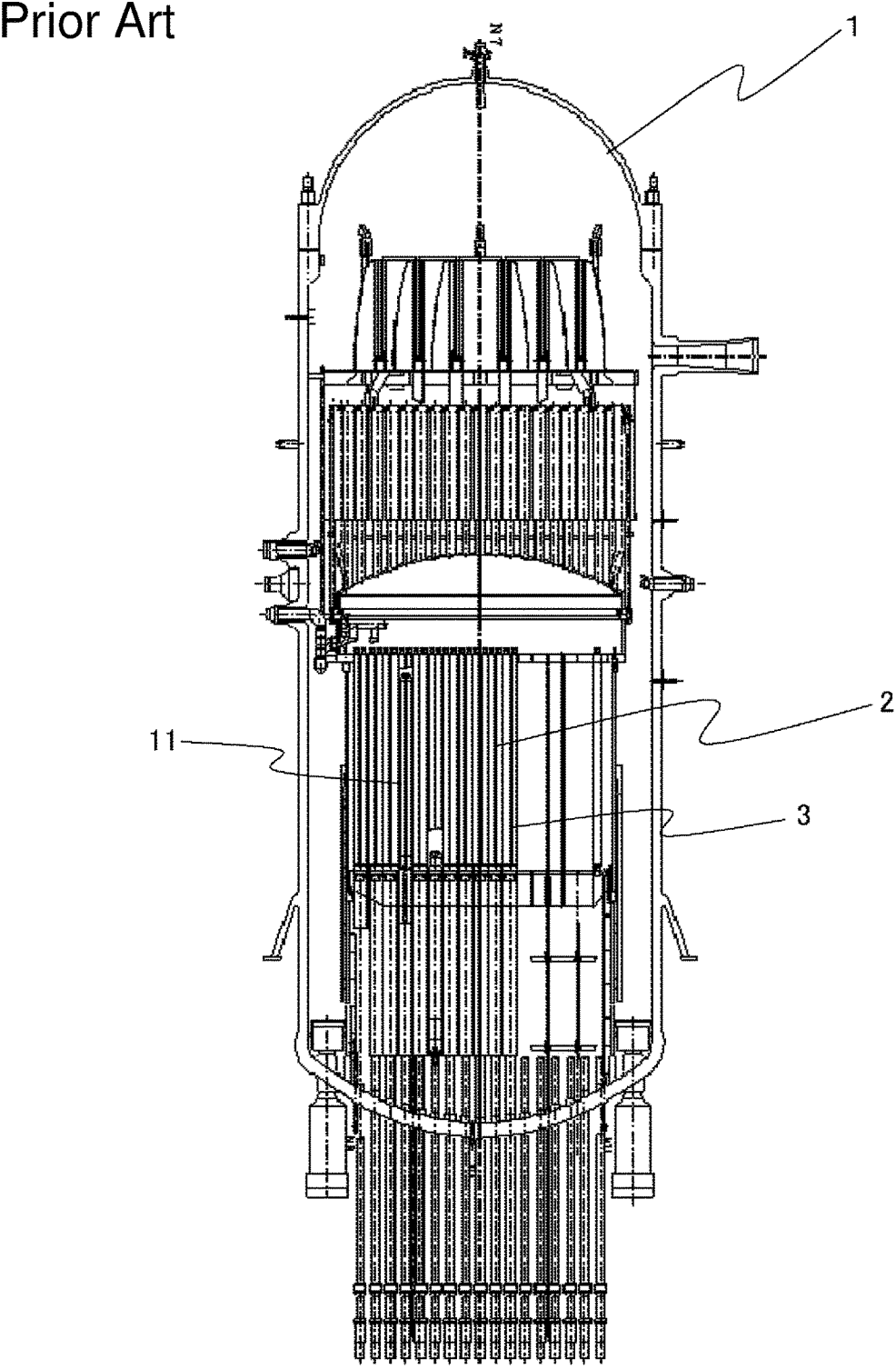
FIG. 18 is a view illustrating a boiling water reactor in the related art.
Figure 19:
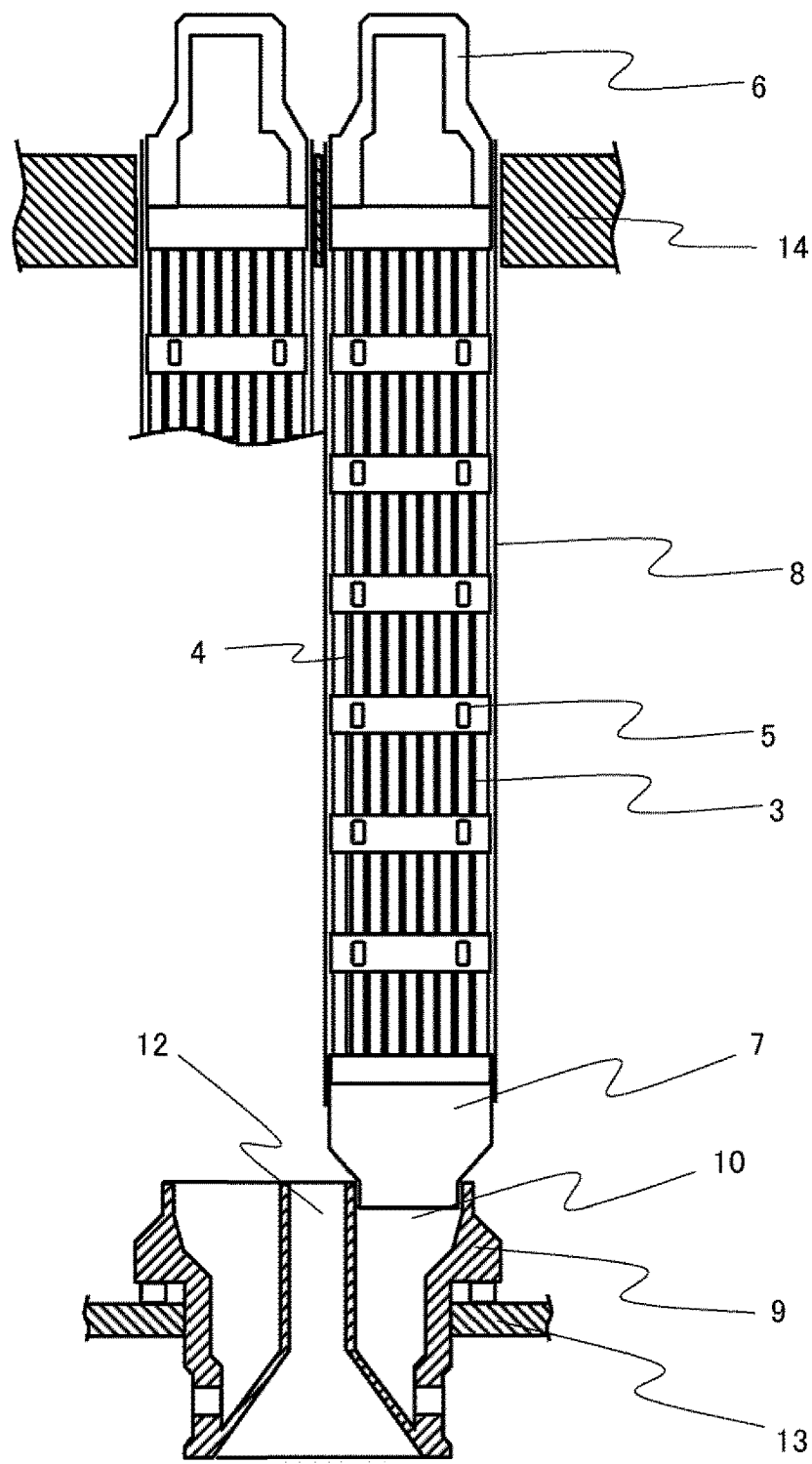
FIG. 19 is a side view illustrating a fuel assembly of the boiling water reactor in the related art.
Figure 20:
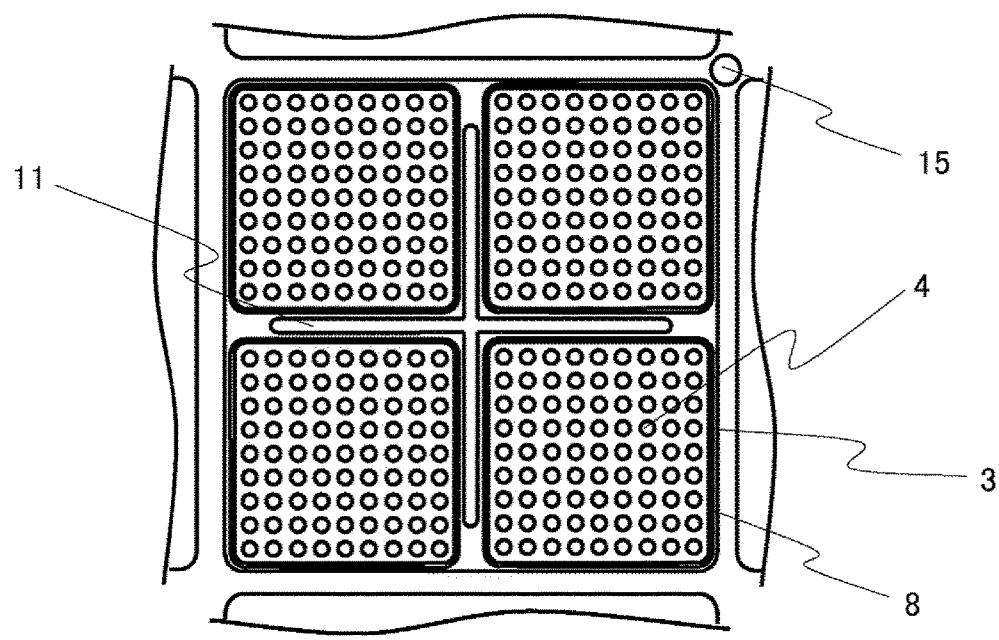
FIG. 20 is a horizontal view illustrating the fuel assembly of the boiling water reactor in the related art.

FIGS. 16 and 17 illustrate Example 5. According to component members as the characteristics of the example, in addition to the extension of the lower portion of the lower tie plate 7 as illustrated in FIG. 14, and the upward extension of the three sockets 10 of the fuel support 9 as illustrated in FIG. 15, connection portions 22 to which the three sockets 10 are connected extend.

As illustrated in FIG. 16, in addition to the effects illustrated in FIG. 13, the members that form the three sockets 10 of the upper portion of the fuel support 9 are connected, the self-support of the fuel assembly 3 improves. Further, the opening 12 is provided at the center of the fuel support 9 as illustrated in FIG. 17 such that a Y-shape type control rod 16 can vertically move. A roller (not illustrated) is attached at the distal end of the wing of the Y-shape type control rod 16 such that smooth movement is performed through a narrow space. As illustrated in FIG. 16, the members, which form the three sockets 10 into which the lower portions of the fuel assemblies 3 are inserted, and the connection portion 22 upwardly extends, and thereby a movement space of the Y-shape type control rod 16 is secured. Even in a case where a minute positional shift occurs when the Y-shape type control rod 16 vertically moves, the roller comes into contact with the opening 12 of the fuel support 9, and thereby it is possible to cause the Y-shape type control rod 16 to smoothly move.

REFERENCE SIGNS LIST

1: reactor pressure vessel
2: nuclear reactor core
3: fuel assembly
4: fuel rod
5: spacer
6: upper tie plate
7: lower tie plate
8: channel box
9: fuel support
10: socket
11: cross-shape type control rod
12: opening
13: core plate
14: upper grid plate
15: installation of neutron instrumentation tube
16: Y-shape type control rod
17: upper support mechanism
20: extension portion
21: stable member
25A, 26A: protrusion
25B, 26B: fitting portion

The invention claimed is:

1. A fuel assembly configured to have a fuel rod, an upper tie plate, a lower tie plate, and a spacer, the fuel assembly comprising:
   a fuel support into which a lower portion of the lower tie plate as a part of the fuel assembly is inserted and which supports a lower portion of the fuel assembly;
   a core plate to which the fuel support is fixed;
   a Y-shape type control rod that is disposed in a space between some fuel assemblies when a plurality of fuel assemblies are arranged in a reactor pressure vessel; and
   an installation of a neutron instrumentation tube that is disposed at a wing of a distal end of the Y-shape type control rod, wherein
      the lower portion of the lower tie plate that is inserted into a socket above the fuel support defines an extension portion, and a stable member is provided around the extension portion, the extension portion defining protrusions that are inserted into L-shaped cavities,
      the upper distal end of the installation of the neutron instrumentation tube is supported and fixed to the channel box in the vicinity of the upper end of the fuel assembly,
      the lower portion of the neutron instrumentation tube is disposed separate from the reactor pressure vessel, and
      the stable members are provided on the periphery of the extension portion of the lower portions of the lower tie plate, and the stable members are disposed at positions at which the stable members are adjacent to but separated by a distance from the neutron instrumentation tube.

2. The fuel assembly according to claim 1, wherein the stable member is provided over the entire circumference of an outer circumferential portion of the extension portion extending from the lower portion of the lower tie plate.

3. The fuel assembly according to claim 1, wherein the lower end surface of the stable member is in contact with an upper surface of the core plate.

4. The fuel assembly according to claim 1, wherein the fuel assemblies are accommodated in a hexagonal channel box in which fuel rods are arranged to form a triangular lattice shape.

* * * * *